US008934110B2

(12) United States Patent  
Ohara

(10) Patent No.: US 8,934,110 B2  
(45) Date of Patent: Jan. 13, 2015

(54) ADMINISTRATING DEVICE FOR ADMINISTRATING A PLURALITY OF DEVICES BY USING DEVICE INFORMATION AND FUNCTION INFORMATION OF USERS

(71) Applicant: Kiyotaka Ohara, Nagoya (JP)

(72) Inventor: Kiyotaka Ohara, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 13/628,966

(22) Filed: Sep. 27, 2012

(65) Prior Publication Data

US 2013/0083343 A1 Apr. 4, 2013

(30) Foreign Application Priority Data

Sep. 30, 2011 (JP) ................................. 2011-217274

(51) Int. Cl.
*G06F 3/12* (2006.01)
*H04N 1/44* (2006.01)
*H04N 1/00* (2006.01)

(52) U.S. Cl.
CPC ............ *G06F 3/1219* (2013.01); *G06F 3/1288* (2013.01); *H04N 1/4433* (2013.01); *G06F 3/1239* (2013.01); *H04N 2201/0094* (2013.01); *H04N 1/4426* (2013.01); *H04N 1/00344* (2013.01)
USPC .............................. 358/1.13; 358/1.14; 726/4

(58) Field of Classification Search
USPC ..................... 358/1.13, 1.14, 1.15, 1.16, 403; 709/223, 229; 710/15; 726/1, 19, 4, 8
See application file for complete search history.

(56) References Cited

U.S. PATENT DOCUMENTS

| | | |
|---|---|---|
| 2002/0097431 A1 | 7/2002 | Ikegami |
| 2003/0167336 A1 | 9/2003 | Iwamoto et al. |
| 2006/0064753 A1* | 3/2006 | Otake et al. ..................... 726/19 |
| 2007/0097448 A1* | 5/2007 | Iizuka ........................... 358/403 |
| 2007/0253014 A1* | 11/2007 | Nakata ........................ 358/1.14 |
| 2007/0283414 A1 | 12/2007 | Sugiyama |
| 2007/0288996 A1* | 12/2007 | Mizuno ............................ 726/4 |

(Continued)

FOREIGN PATENT DOCUMENTS

| | | |
|---|---|---|
| CN | 101272431 A | 9/2008 |
| JP | 2001-014123 A | 1/2001 |

(Continued)

OTHER PUBLICATIONS

Extended Search Report dated Nov. 27, 2013 from related European Application No. 12 18 6155.3.
Notification of Reasons for Rejection dated Oct. 21, 2014 received from the Japanese Patent Office in related application JP 2011-217274 together with English language translation.

(Continued)

*Primary Examiner* — David S Cammack
(74) *Attorney, Agent, or Firm* — Scully, Scott, Murphy & Presser, PC

(57) ABSTRACT

An administrating device may send first usage information to a specific device based on specific identification information, including specific device identification information for identifying the specific device, specific user identification information for identifying a specific user, or a combination thereof, and each information within a memory in a case where the specific identification information is received from the specific device. The first usage information may be related to which type of function among the two or more types of functions the specific user is allowed to use in the specific device.

10 Claims, 7 Drawing Sheets

(56) References Cited

U.S. PATENT DOCUMENTS

| | | |
|---|---|---|
| 2008/0007758 A1* | 1/2008 | Miyashita .................... 358/1.14 |
| 2008/0106754 A1* | 5/2008 | Oomori ........................ 358/1.15 |
| 2008/0130042 A1* | 6/2008 | Iizuka et al. ................. 358/1.15 |
| 2008/0235434 A1 | 9/2008 | Eun et al. |
| 2008/0282333 A1* | 11/2008 | Teramoto et al. .................. 726/8 |
| 2009/0086264 A1 | 4/2009 | Yoshida |
| 2009/0178102 A1* | 7/2009 | Alghathbar et al. .............. 726/1 |
| 2009/0180141 A1* | 7/2009 | Takaishi et al. .............. 358/1.15 |
| 2009/0207439 A1* | 8/2009 | Oomura ........................ 358/1.15 |
| 2011/0002003 A1* | 1/2011 | Suwabe ........................ 358/1.14 |
| 2011/0075176 A1* | 3/2011 | Nishio ........................ 358/1.13 |

FOREIGN PATENT DOCUMENTS

| | | |
|---|---|---|
| JP | 2007-323324 A | 12/2007 |
| JP | 2009-087159 A | 4/2009 |
| JP | 2011-123865 A | 6/2011 |

OTHER PUBLICATIONS

Notification of First Office Action dated Oct. 28, 2014 received from the Chinese Patent Office in related application 201210365743.X together with English language translation.

* cited by examiner

FIG. 2

Function Information Table 90

| Function | Design Function | Sales Function | Guest Function |
|---|---|---|---|
| Monochrome Print | ○ | ○ | ○ |
| Color Print | ○ | ○ | × |
| Scan | ○ | ○ | × |
| FAX | × | ○ | × |
| Monochrome Copy | ○ | ○ | ○ |
| Color Copy | × | ○ | × |

FIG. 3

User Group Table Group 70

1st Design Dept. Table 72

| 1st Design Dept. | | |
|---|---|---|
| User | ID | Password |
| Tom | aaa | 111 |
| John | bbb | 222 |

2nd Design Dept. Table 76

| 2nd Design Dept. | | |
|---|---|---|
| User | ID | Password |
| Yamada | ddd | 444 |
| John | bbb | 222 |

Sales Dept. Table 74

| Sales Dept. | | |
|---|---|---|
| User | ID | Password |
| May | ccc | 333 |
| John | bbb | 222 |

Guest Table 78

| Guest | | |
|---|---|---|
| User | ID | Password |
| Bob | fff | 666 |
| Ken | ggg | 777 |

FIG. 4

MFP Group Table Group 80

1st MFP Table 82

| 1st Floor MFP |
|---|
| MFP Name |
| MFP110 |
| MFP120 |

2nd MFP Table 84

| 2nd Floor MFP |
|---|
| MFP Name |
| MFP210 |
| MFP220 |

US 8,934,110 B2

ADMINISTRATING DEVICE FOR ADMINISTRATING A PLURALITY OF DEVICES BY USING DEVICE INFORMATION AND FUNCTION INFORMATION OF USERS

CROSS-REFERENCE TO RELATED APPLICATIONS

This application claims priority to Japanese Patent Application No. 2011-217274, filed on Sep. 30, 2011, the contents of which are hereby incorporated by reference into the present application.

TECHNICAL FIELD

The present application discloses an art for administrating a plurality of devices.

DESCRIPTION OF RELATED ART

A server connected with a plurality of printers via a LAN is known. The server stores an administrating table in which the plurality of printers are registered. In a case of receiving a print request from a PC, the server rejects the print request if printer information and a user name included in the received print request are not combined in the administrating table.

SUMMARY

In a case where a plurality of devices being administration targets are capable of executing two or more types of functions (e.g., color printing and monochrome printing), an art is required for administrating not only which device the user is allowed to use from among the plurality of devices, but also for administrating which type of function the user is allowed to use from among the two or more types of functions. In the present specification, a technique is presented that is capable of appropriate collective administration of a plurality of devices capable of executing two or more types of functions.

An art disclosed in the application is an administrating device configured to be connected with, a plurality of devices via a network and configured to administrate the plurality of devices. The administrating device may comprise one or more processors and an instruction memory. The instruction memory may store computer-readable instructions therein. The computer-readable instructions, when executed by the one or more processors, may cause the administrating device to perform storing in a specific memory, for each of a plurality of users, a combination of device information and function information. The device information may be related to one or more devices usable by the user among the plurality of devices. The function information may be related to one or more types of functions usable by the user among two or more types of functions which the plurality of devices are capable of executing; receiving specific identification information from a specific device among the plurality of devices, the specific identification information including specific device identification information for identifying the specific device, specific user identification information for identifying a specific user, or a combination thereof; and sending first usage information to the specific device based on the specific identification information and the each information within the specific memory in a case where the specific identification information is received, the first usage information being related to which type of function among the two or more types of functions the specific user is allowed to use in the specific device.

Moreover, a control method, a computer program, and a computer readable recording device that stores the computer program, all for realizing the administrating device, are also novel and useful. In addition, a network system that includes the administrating device and the plurality of devices is also novel and useful.

BRIEF DESCRIPTION OF THE DRAWINGS

FIG. 2 shows a function information table.
FIG. 3 shows user group tables of a user group table group.
FIG. 4 shows multi-function peripheral group tables of an MFP group table group.

EMBODIMENT (Configuration of Network System 2)
FIG. 1 shows a network system 2 that has been constructed in e.g., a specific company. The network system 2 comprises an administrating server 10, a 1st (first) floor MFP group 100, and a 2nd (second) floor MFP group 200. The 1st floor MFP group 100 includes a plurality (two in FIG. 1) of multi-function peripherals (MFP) 110, 120 installed on the first floor of the specific company. The 2nd floor MFP group 200 includes a plurality (two in FIG. 1) of multi-function peripherals 210, 220 installed on the second floor of the specific company. A unique multi-function peripheral name (i.e., MFP 110, MFP 120, MFP 210, MFP 220) has been given to each of the plurality of multi-function peripherals 110 to 220. The administrating server 10 is connected, via a LAN 4, with each of the plurality of multi-function peripherals 110, 120 included in the 1st floor MFP group 100, and with each of the plurality of multi-function peripherals 210, 220 included in the 2nd floor MFP group 200.

Figure 1:
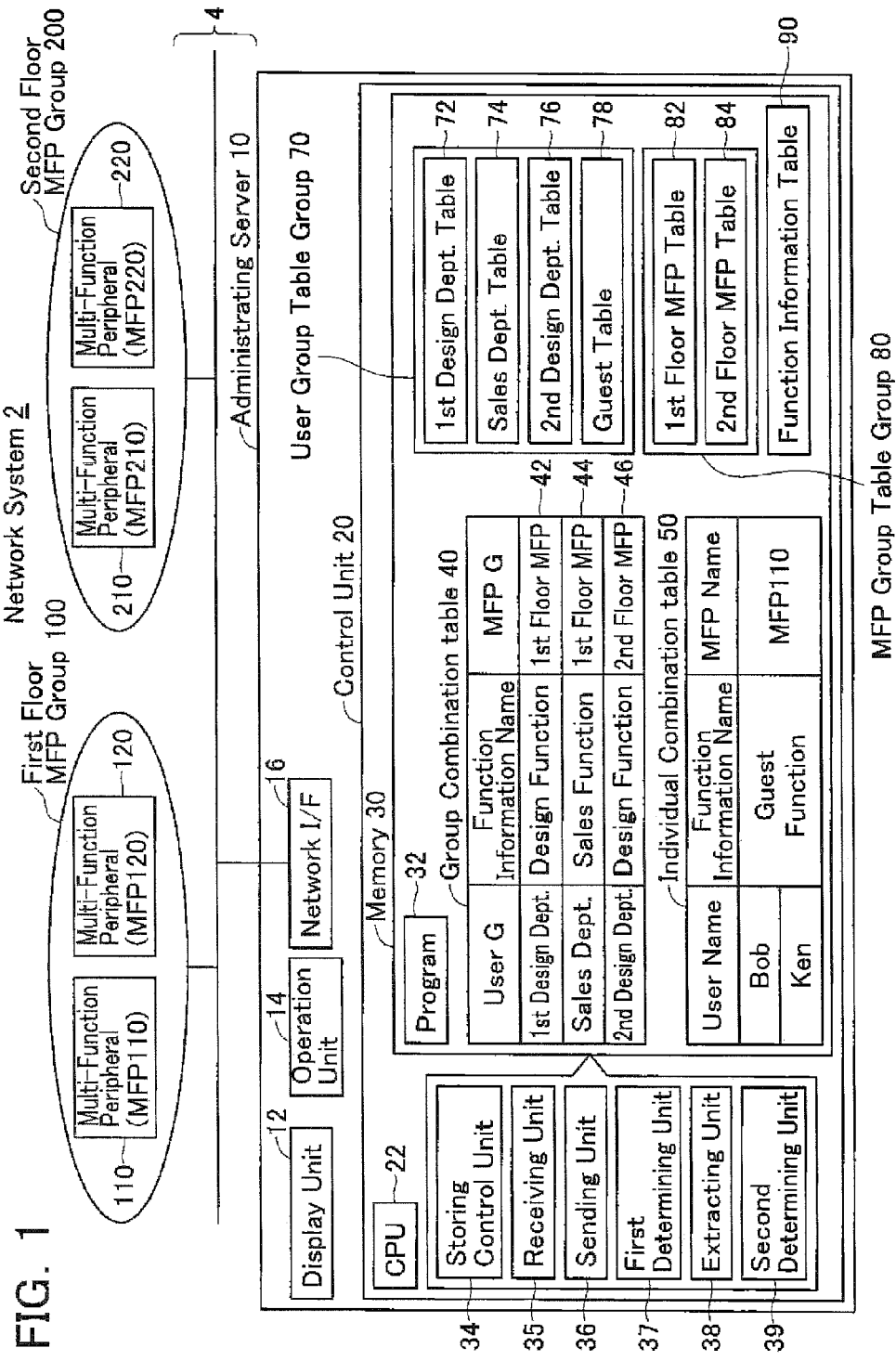
FIG. 1 shows the configuration of a network system.

(Configuration of Administrating Server 10)
The administrating server 10 is a server for administrating each of the plurality of multi-function peripherals 110 to 220. The administrating server 10 comprises a display unit 12, an operation unit 14, a network interface 16 and a control unit 20. The display unit 12 displays various types of information according to instructions from the control unit 20. The operation unit 14 comprises a keyboard and a mouse. The network interface 16 is connected with the LAN 4.

The control unit 20 comprises a CPU 22 and a memory 30. The CPU 22 executes various processes according to a program 32 stored in the memory 30. Thereby, the functions of a storing control unit 34, a receiving unit 35, a sending unit 36, a first determining unit 37, an extracting unit 38 and a second determining unit 39 are realized. For example, an administrator of the network system 2 may install the program 32, which has been stored on a computer-readable recording device (e.g., a CDROM) on the administrating server 10.
The memory 30 stores a plurality of tables 40, 50, 70, 80, 90. The group combination table 40 includes a plurality of items of relation information 42 to 46. Each of the plurality of items of relation information 42 to 46 is information in which a user group name (e.g., "1st design dept.(department)"), a function information name (e.g., "design function"), and a multi-function peripheral group name (e.g., "1st floor MFP") are combined. The individual combination table 50 stores a combination of a user name of an individual user (e.g., "Bob"), a function information name (e.g., "guest function"), and a multi-function peripheral name (e.g., "MFP 110").

(Function Information Table 90; FIG. 2)

As shown in FIG. 2, the function information table 90 is a table in which a function information name (e.g., "design function", "sales function", "guest function") and function information (e.g., monochrome printing "O", FAX "X") are combined. The function information is information indicating, for each of a plurality of types of function that the plurality of multi-function peripherals 110, etc. are capable of executing, whether the type of function may be used (i.e., "O"), or may not be used (i.e., "X").

(User Group Table Group 70; FIG. 3)

As shown in FIG. 3, the user group table group 70 includes a plurality of user group tables 72 to 78. Each of the plurality of user group tables 72 to 78 is a table in which a user group name (e.g., "1st design dept.", "sales dept", "2nd design dept.", "guest"), a user name (e.g., "Tom"), a user ID (e.g., "aaa") and a password (e.g., "111") are combined.

(MFP Group Table Group 80; FIG. 4)

As shown in FIG. 4, the MFP group table group 80 includes a plurality of MFP tables 82, 84. Each of the plurality of MFP group tables 82, 84 is a table in which a multi-function peripheral group name (e.g., "1st floor MFP", "2nd floor MFP") and a multi-function peripheral name (e.g., "MFP 110", "MFP 120") are combined.

Figure 5:
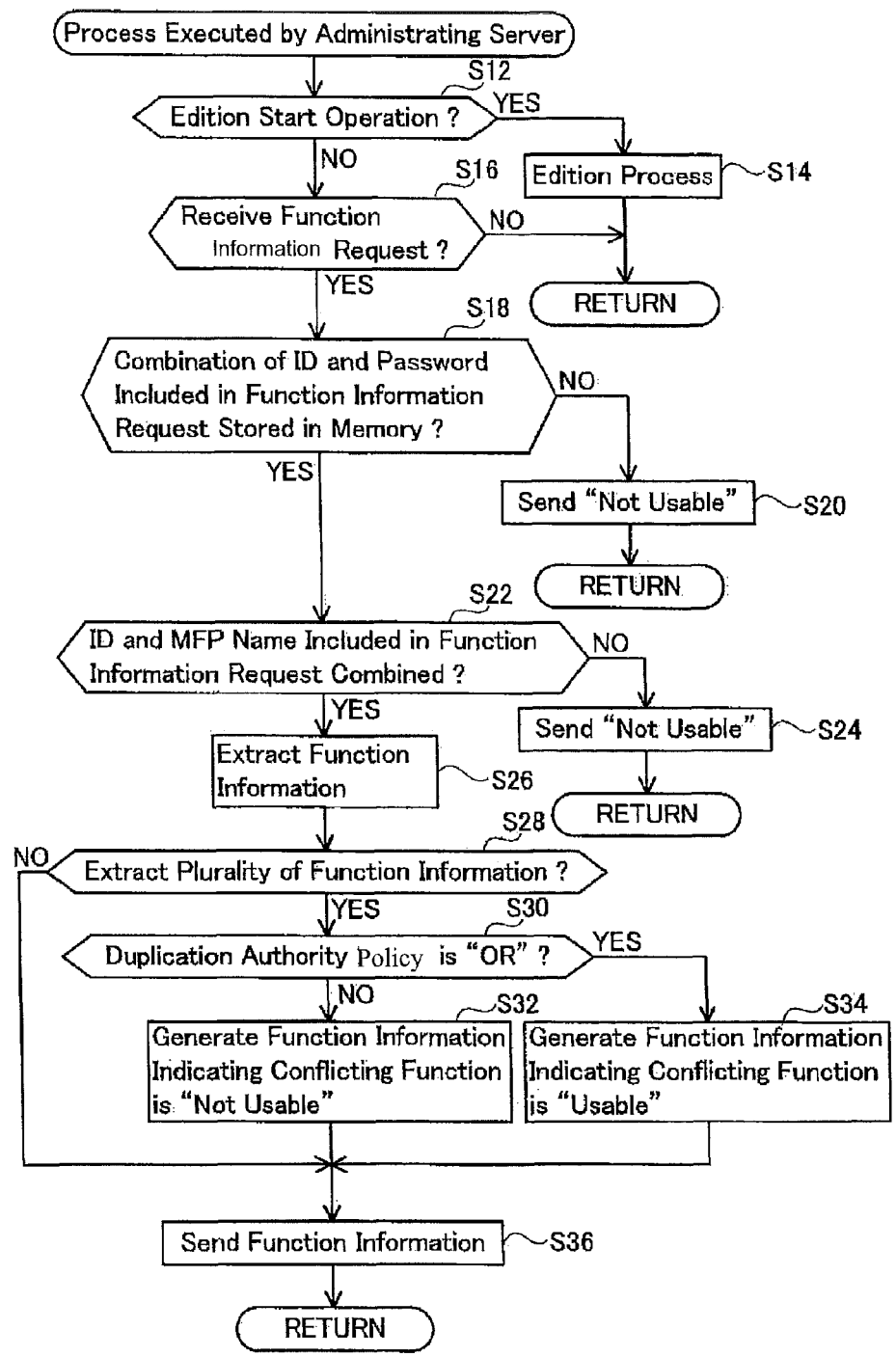
FIG. 5 shows a flowchart of a process executed by an administrating server.

(Process Executed by Administrating Server; FIG. 5)

The contents of a process executed by the control unit 20 will be described with reference to FIG. 5. The present process starts when a power source of the administrating server 10 is turned ON. The administrator operates the operation unit 14, allowing an edition start operation to be executed. In S12, the control unit 20 monitors whether the edition start operation has been executed. In a case where the edition start operation has been executed (YES in S12), in S14 the control unit 20 executes an edition process. In a case where the edition, start operation has not been executed (NO in S12), the control unit 20 proceeds to S16.

(Edition Process)

Figure 6:
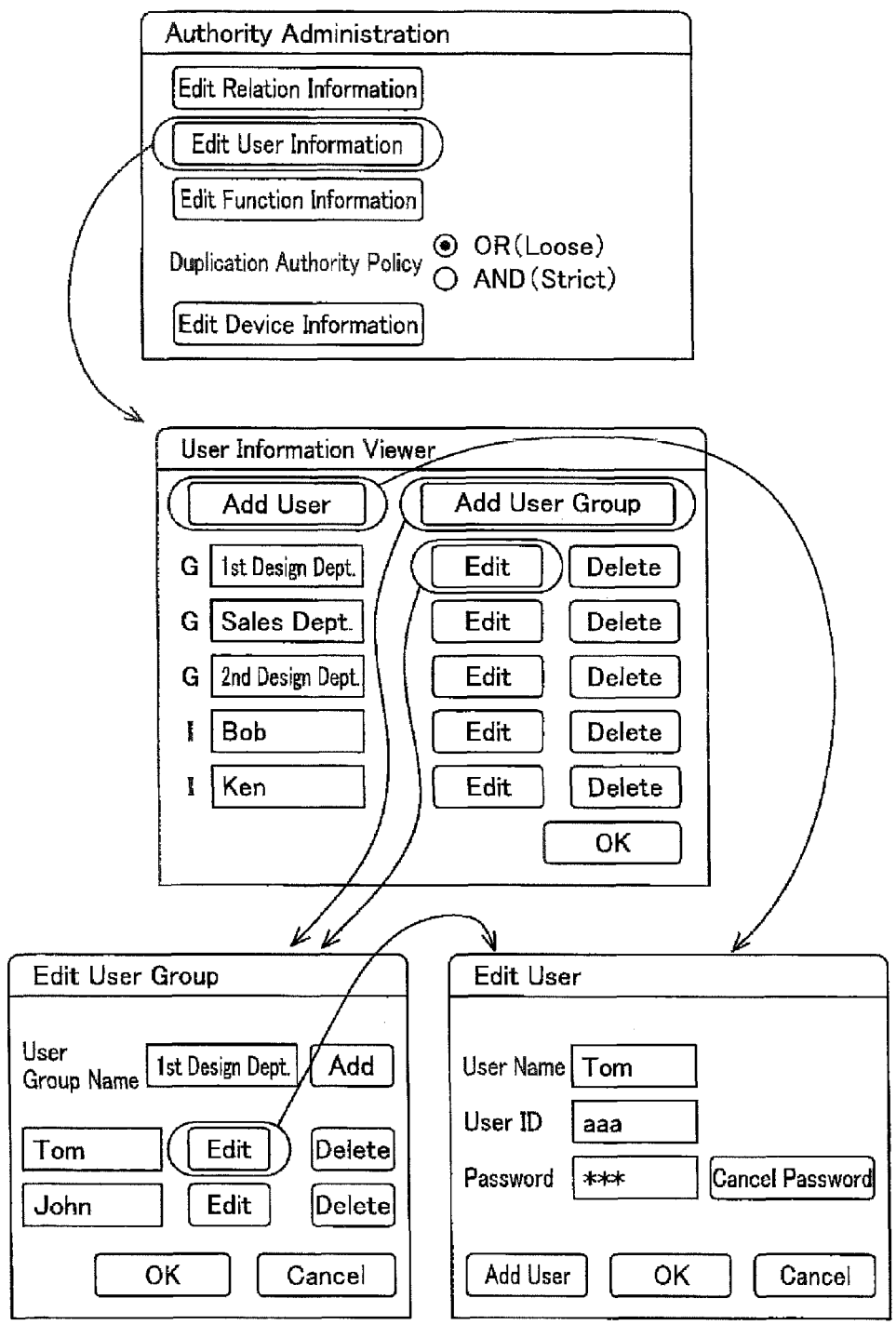
FIG. 6 shows transition of a screen in a case of editing user information.

As shown in FIG. 6, when the administrator executes the edition start operation in the operation unit 14 (YES in S12 of FIG. 5), the control unit 20 causes an "authority administration" screen to be displayed in the display unit 12. Moreover, when the administrator operates the operation unit 14 to execute an edition end operation, the control unit 20 closes the "authority administration" screen, ending the edition process.

By operating the operation unit 14, the administrator can select either "OR" or "AND" of a duplication authority policy on the "authority administration" screen. The storing control unit 34 stores the duplication authority policy selected by the administrator in the memory 30. Moreover, the duplication authority policy is used in the determination of S30 of FIG. 5 (to be described).

By operating the operation unit 14, the administrator can further operate a button from among an edit relation information button, an edit user information button, an edit function information, button, and an edit device information button.

When the administrator operates the edit user information button, the control unit 20 causes a "user information viewer" screen to be displayed in the display unit 12. The "user information viewer" screen displays the user group names (e.g., "1st design dept.") included in the existing user group tables 72 to 76 (see FIG. 2) and the user name (e.g., "Bob") included in the guest table 78.

When the administrator operates an add user group button on the "user information viewer" screen, the control unit 20 causes an "edit user group" screen to be displayed in the display unit 12. The administrator can input a user group name (e.g., "1st design dept.") to the "edit user group" screen.

When the administrator operates an add button on the "edit user group" screen, the control unit 20 causes an "edit user" screen to be displayed in the display unit 12. The administrator can input a user name, a user ID and a password to the "edit user" screen.

By executing the aforementioned operations, the storing control unit 34 adds, to the user group table group 70, a new user group table in which the user group name (e.g., "1st design dept.") that was input to the "edit user group" screen and the information (i.e., a user name (e.g., "Tom"), a user ID (e.g., "aaa") and a password (e.g., "111")) that was input to the "edit user" screen are combined.

Moreover, when the administrator operates an add user button on the "user information viewer" screen, the "edit user" screen is displayed in the display unit 12. In a case where the user name, user ID and password are input here, the storing control unit 34 adds the input user name to the individual combination table 50 (see FIG. 1), and adds the input user name, user ID and password to the guest table 78 (see FIG. 3).

Further, by operating an edit button on the "user information viewer" screen or an edit button on the "edit user group" screen, the administrator can change the contents of the existing user group table.

Figure 7:
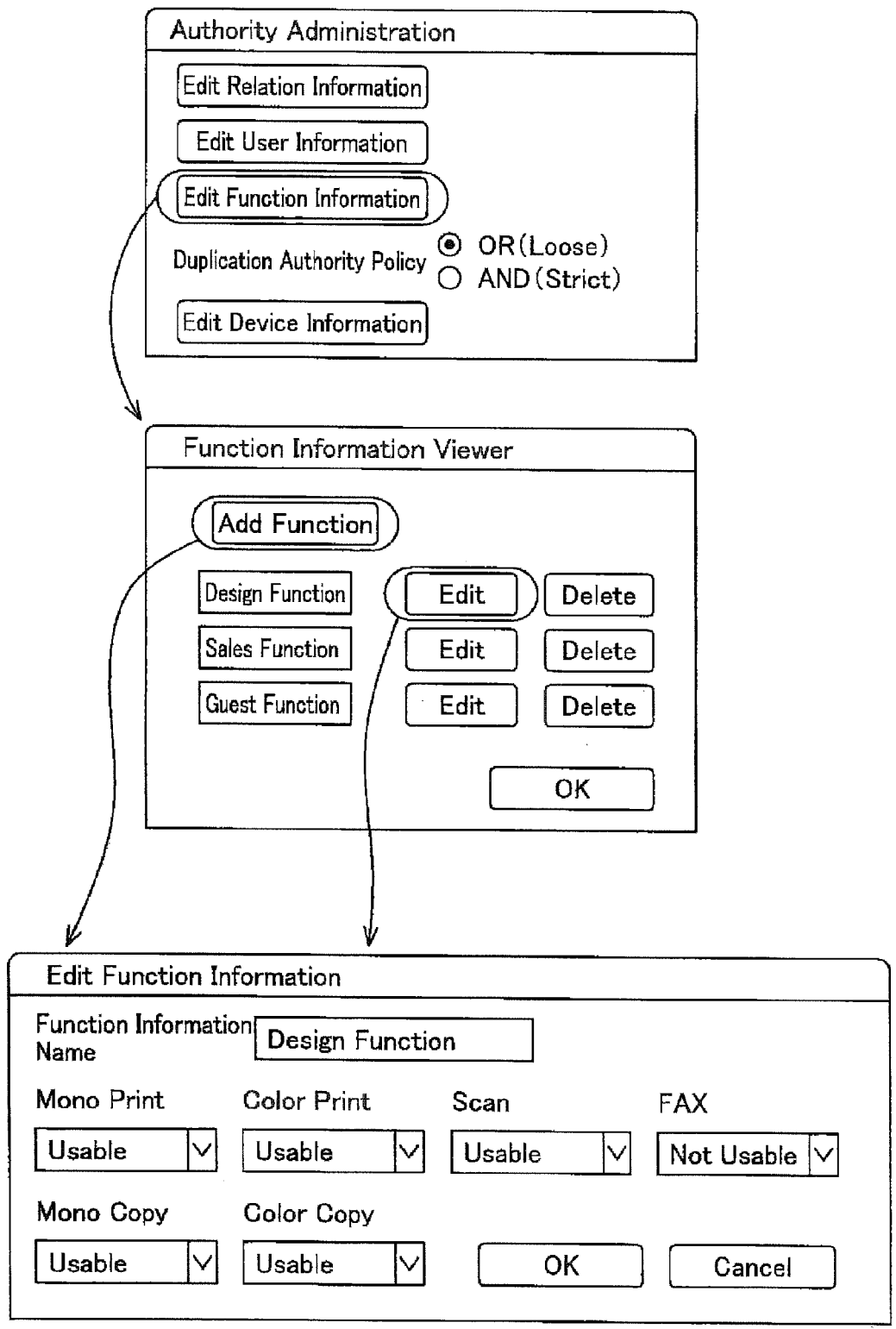
FIG. 7 shows transition of a screen in a case of editing function information.

As shown in FIG. 7, when the administrator operates an edit function information button on the "authority administration" screen, the control unit 20 causes a "function information viewer" screen to be displayed in the display unit 12. The "function information viewer" screen displays the function information names (e.g., "design function") included in the function information table 90 (see FIG. 2).

When the administrator operates an add function button on the "function information viewer" screen, the control unit 20 causes an "edit function information" screen to be displayed in the display unit 12. The administrator can input a function information name (e.g., "design function") to the "edit function information" screen. By operating the operation unit 14, the administrator can further select either "usable" or "not usable" for each of the plurality of functions included in the "edit function information" screen.

By executing the aforementioned operations, the storing control unit 34 adds, to the function information table 90 (see FIG. 2), a combination of the function information name (e.g., "design function") that was input to the "edit function information" screen, and the function information (i.e., information indicating the function name and the selection result of the user for each of the plurality of functions) that was input to the "edit function information" screen.

Moreover, by operating an edit button corresponding to the function information name on the "function information viewer" screen, the administrator can change the function information combined with the function information name (i.e., change "usable" or "not usable" of each function).

Figure 8:
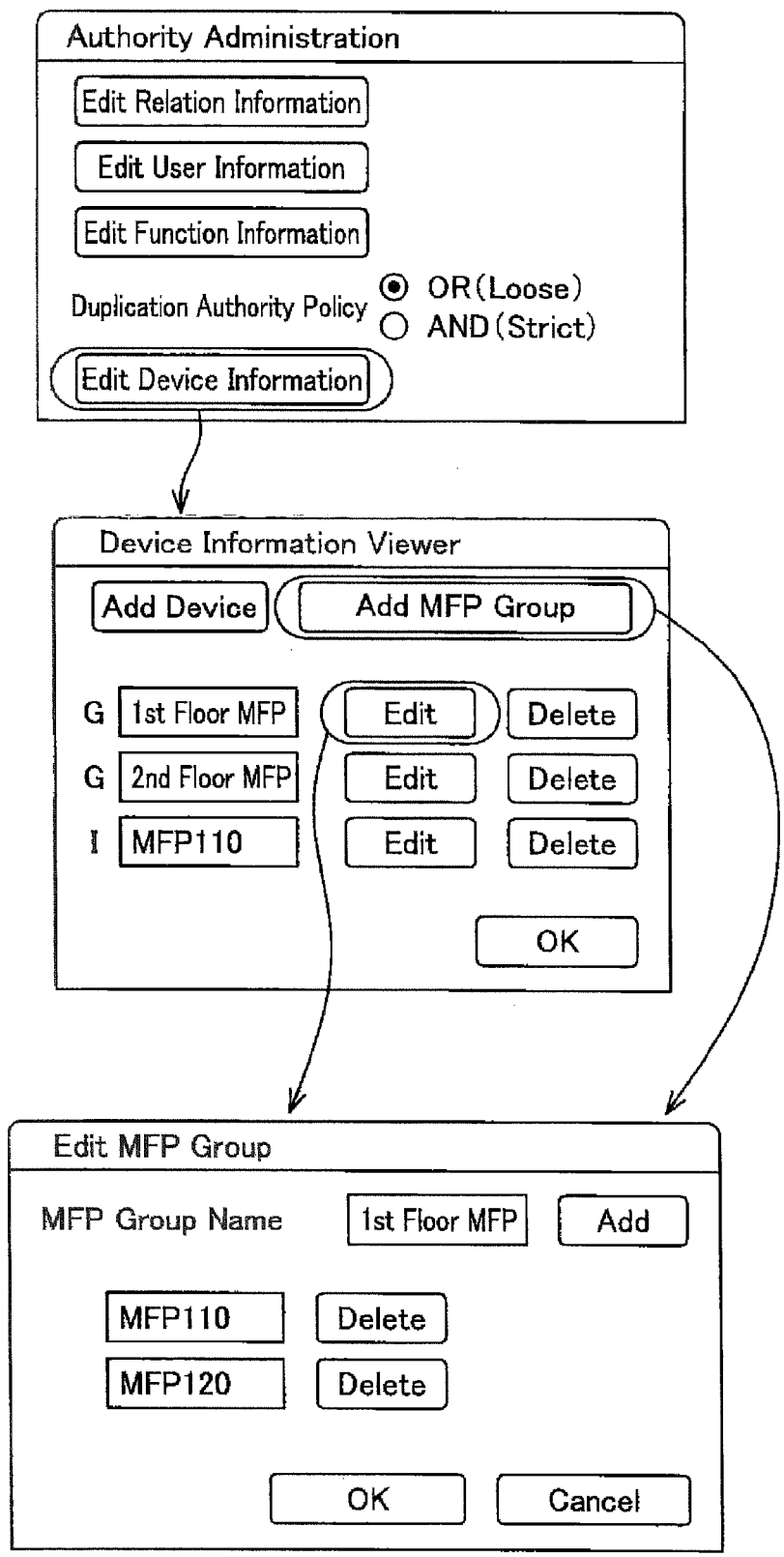
FIG. 8 shows transition of a screen in a case of editing device information.

As shown in FIG. 8, when the administrator operates an edit device information button on the "authority administration" screen, the control unit 20 causes a "device information viewer" screen to be displayed in the display unit 12. The "device information viewer" screen shows the multi-function peripheral group names (e.g., "1st floor MFP") included in the existing MFP group tables 82, 84 (see FIG. 4), and the multi-function peripheral names (e.g., "MFP 110") included in the individual combination table 50 (see FIG. 1).

When the administrator operates an add multi-function peripheral group button on the "device information viewer" screen, the control unit 20 causes an "edit multi-function peripheral group" screen to be displayed in the display unit 12. The administrator can input a multi-function peripheral group name (e.g., "1st floor MFP") to the "edit multi-function peripheral group" screen. When the administrator operates an add button on the "edit multi-function peripheral group" screen, the control unit 20 causes a box for inputting the multi-function peripheral name to be newly displayed on the "edit multi-function peripheral group" screen. The administrator can input the multi-function peripheral name (e.g., "MFP 110") into the box.

By executing the aforementioned operations, the storing control unit 34 adds, to the MFP group table group 80 (see FIG. 4), a new MFP group table in which the multi-function peripheral group name (e.g., "1st floor MFP") that was input to the "edit multi-function peripheral group" screen, and the multi-function peripheral name (e.g., "MFP 110") that was input to the box are combined.

Moreover, by operating an edit button on the "device information viewer" screen, the administrator can change the contents of the multi-function peripheral group specified by the multi-function peripheral group name corresponding to the edit button (i.e., can add or delete a multi-function peripheral name). Further, when the administrator operates an add device button on the "device information viewer" screen, the control unit 20 causes a box for inputting the multi-function peripheral name (e.g., "MFP 120") to be newly displayed on the "device information viewer" screen. In a case where a multi-function peripheral name (e.g., "MFP 120") is input into the box by the administrator, the storing control unit 34 adds the input multi-function peripheral name to the individual combination table 50 (see FIG. 1).

Figure 9:
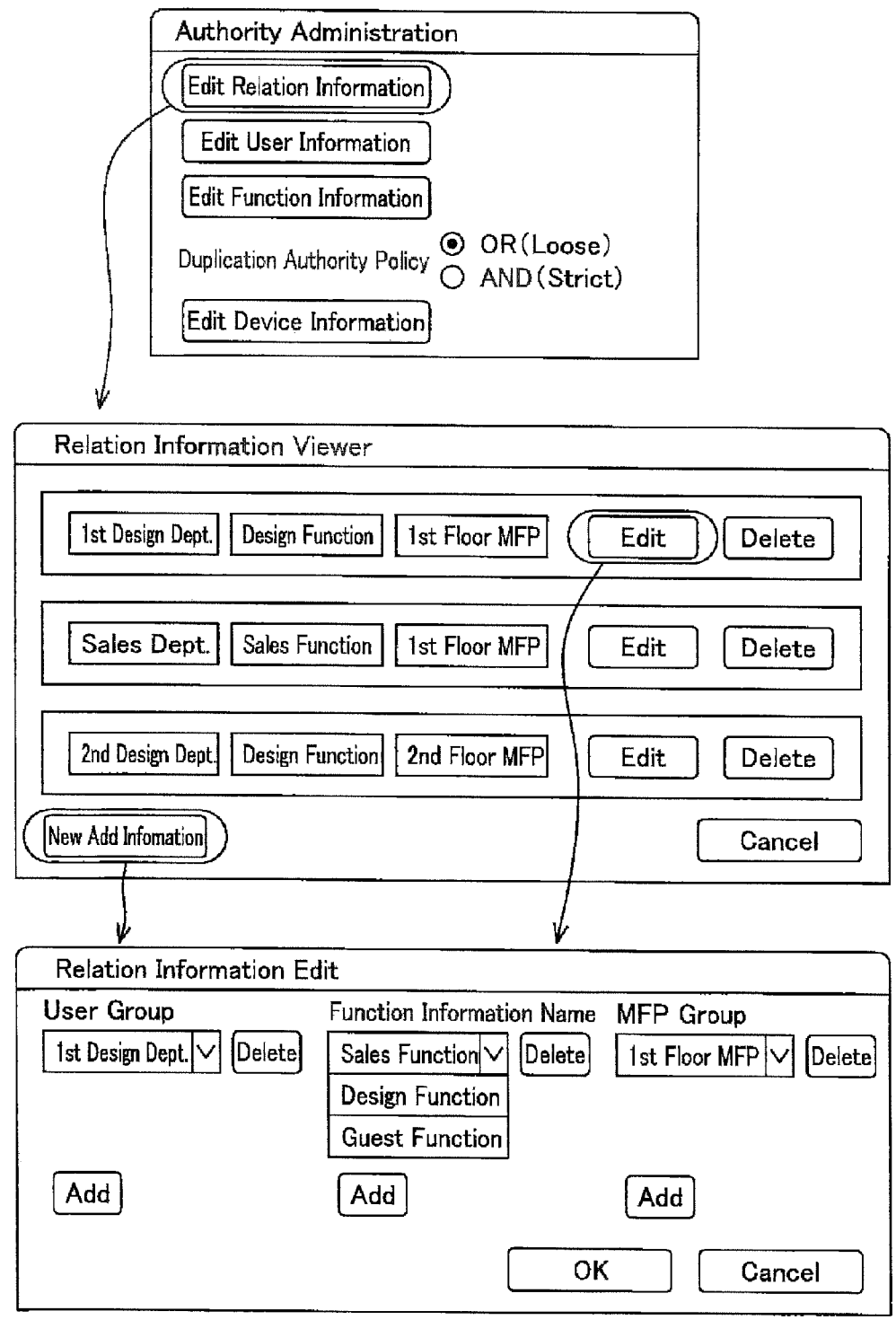
FIG. 9 shows transition of a screen in a case of editing relation information.

As shown in FIG. 9, when the administrator operates an edit relation information button on the "authority administration" screen, the control unit 20 causes a "relation information viewer" screen to be displayed in the display unit 12. The "relation information viewer" screen shows the relation information 42 to 46 included in the group combination table 40 (see FIG. 1).

When the administrator operates an add new information button on the "relation information viewer" screen, the control unit 20 causes an "edit relation information" screen to be displayed in the display unit 12. The administrator can select one user group name from among the user group names (e.g., "1st design dept.") included in the existing user group tables 72 to 78 (see FIG. 3). Similarly, the administrator can select one multi-function peripheral group name from among the multi-function peripheral group names (e.g., "1st floor MFP") included in the existing MFP group tables 82, 84 (see FIG. 4). Similarly, the administrator can select one function information name from among the function information names (e.g., "design function") included in the function information table 90.

By executing the aforementioned operations, the storing control unit 34 adds, to the group combination table 40 (see FIG. 1), new relation information in which the items of information selected in the "edit relation information" screen are combined (i.e., the user group name (e.g., "1st design dept."), the multi-function peripheral group name (e.g., "1st floor MFP") and the function information name (e.g., "design function")).

Moreover, by operating an edit button corresponding to the relation information on the "relation information viewer" screen, the administrator can change the relation information (i.e., change the user group name, etc.).

Specific examples of the contents of the edition process will be explained. The administrator inputs the user group name "1st design dept." into the "edit user group" screen of FIG. 6. The administrator further operates the add button on the "edit user group" screen of FIG. 6, causing the "edit user" screen of FIG. 6 to be displayed in the display unit 12. The administrator inputs user name "Tom", user ID "aaa" and password "111" into the "edit user" screen of FIG. 6. The administrator further operates the add user button on the "edit user" screen of FIG. 6, causing the "edit user" screen of FIG. 6 (i.e., an "edit user" screen into which the user name, etc. has not been input) to be newly displayed in the display unit 12. The administrator inputs user name "John", user ID "bbb" and password "222" into the new "edit user" screen. Thereby, the storing control unit 34 temporarily stores first combination information that includes the user name "Tom", the user ID "aaa" and the password "111" in the memory 30 in combination with the user group name "1st design dept.", and temporarily stores second combination information that includes the user name "John", the user ID "bbb" and the password "222" in the memory 30 in combination with the user group name "1st design dept".

Next, the administrator causes an "function information viewer" screen of FIG. 7 to be displayed in the display unit 12, and operates an add function button on the "function information viewer" screen. The administrator inputs the function information name "design function" to the "function information" screen of FIG. 7 displayed in the display unit 12. Further, the administrator selects either "usable" or "not usable" for each of the plurality of functions. Thereby, the storing control unit 34 temporarily stores a combination of the function information name "design function" and the function information (i.e., information indicating the function name and the selection result of the user for each of the plurality of functions) in the memory 30.

Next, the administrator causes the "device information viewer" screen of FIG. 8 to be displayed in the display unit 12, and operates the add multi-function peripheral group button on the "device information viewer" screen, causing the "edit multi-function peripheral group" screen of FIG. 8 to be displayed in the display unit 12. The administrator inputs the multi-function peripheral group name "1st floor MFP" and the multi-function peripheral names "MFP 110", "MFP 120" into the "edit multi-function peripheral group" screen of FIG. 8. Thereby, the storing control unit 34 temporarily stores a combination of the multi-function peripheral group name "1st floor MFP", the multi-function peripheral name "MFP 110" and the multi-function peripheral name "MFP 120" in the memory 30.

Next, the administrator causes the "relation information viewer" screen of FIG. 9 to be displayed in the display unit 12, and operates the add new information button on the "relation information viewer", causing the "edit relation information" screen of FIG. 9 to be displayed in the display unit 12. The administrator selects the user group name "1st design dept.", the function information name "design function" and the multi-function peripheral group name "1st floor MFP". The storing control unit 34 temporarily stores the combination of the user group name "1st design dept.", the function information name "design function" and the multi-function peripheral group name "1st floor MFP" in the memory 30.

After the aforementioned operations, the administrator executes a first edition end operation (i.e., operates an OK button), whereupon the storing control unit 34 executes the processes (A1) to (A3) below based on the contents temporarily stored in the memory 30. In (A1), the storing control unit 34 adds, to the group combination table 40 (see FIG. 1), new relation information in which the user group name "1st design dept.", the function information name "design function" and the multi-function peripheral group name "1st floor MFP" are combined.

In (A1), the storing control unit 34 further adds, to the user group table group 70, the 1st design dept. table 72 (see FIG. 3) in which the user group name "1st design dept.", the first combination information (i.e., the user name "Tom", the user ID "aaa" and the password "111") and the second combination information (i.e., the user name "John", the user ID "bbb" and the password "222") are combined. Thereby, the user IDs "aaa" and "bbb", the function information name "design function" and the multi-function peripheral group name "1st floor MFP" are combined.

In (A2), the storing control unit 34 adds, to the MFP group table group 80, the 1st floor MFP table 82 (see FIG. 4) in which the multi-function peripheral group name "1st floor MFP", the multi-function peripheral name "MFP 110" and the multi-function peripheral name "MFP 120" are combined.

In (A3), the storing control unit 34 adds, to the function information table 90 (see FIG. 2), a combination of the function information name "design function" and the function information (i.e., information indicating, for each of the plurality of functions, whether the function is usable (i.e., "O") or not usable (i.e., "X")).

By the aforementioned processes (A1) to (A3), the user IDs "aaa", "bbb", the multi-function peripheral names "MFP 110", "MFP 120", and the function information specified by the function information name "design function" are combined. According to this configuration, the one user group name "1st design dept." can be stored in combination with the multi-function peripheral group name "1st floor MFP" and the function information name "design function", thereby allowing each of the plurality of user IDs "aaa", "bbb" included in the user group corresponding to the one user group name "1st design dept." to be combined with the multi-function peripheral names "MFP 110", "MFP 120" and the function information specified by the function information name "design function". If there were a configuration in which the multi-function peripheral names "MFP 110", "MFP 120" and the function information specified by the function information name "design function" were stored in combination with the user ID "aaa" in a specific storage area in the memory 30 and, further, the multi-function peripheral names "MFP 110", "MFP 120" and the function information specified by the function information name "design function" were stored in combination with the user ID "bbb" in a storage area in the memory 30 that is different from the aforementioned specific storage area, identical multi-function peripheral names and identical function information would have to be stored in different storage areas in the memory 30. According to the configuration of the present embodiment, identical multi-function peripheral names and identical function information do not need to be stored in different storage areas in the memory 30 for each of the plurality of user IDs "aaa", "bbb". Consequently, the amount of information stored in the memory 30 can be reduced.

Next, after executing the first edition end operation, the administrator further executes the edition start operation. The administrator inputs the user group name "2nd design dept." into the "edit user group" screen of FIG. 6. The administrator further operates the add button on the "edit user group" screen of FIG. 6, causing the "edit user" screen of FIG. 6 to be displayed in the display unit 12. The administrator inputs a user name "Yamada", a user ID "ddd" and a password "444" into the "edit user" screen of FIG. 6. Thereby, the storing control unit 34 temporarily stores combination information (i.e., the user name "Yamada", the user ID "ddd" and the password "444") in combination with the user group name "2nd design dept" in the memory 30.

Next, the administrator causes the "device information viewer" screen of FIG. 8 to be displayed in the display unit 12 and operates the add multi-function peripheral group button on the "device information viewer" screen, causing the "edit multi-function peripheral group" screen of FIG. 8 to be displayed in the display unit 12. The administrator inputs the multi-function peripheral group name "2nd floor MFP" and the multi-function peripheral names "MFP 210", "MFP 220" into the "edit multi-function peripheral group" screen of FIG. 8. Thereby, the storing control unit 34 temporarily stores a combination of the multi-function peripheral group name "2nd floor MFP", the multi-function peripheral name "MFP 210" and the multi-function peripheral name "MFP 220" in the memory 30.

Next, the administrator causes the "relation information viewer" screen of FIG. 9 to be displayed in the display unit 12 and operates the add new information button on the "relation information viewer" screen, causing the "edit relation information" screen of FIG. 9 to be displayed in the display unit 12. The administrator selects the user group name "2nd design dept." and the multi-function peripheral group name "2nd floor MFP". The administrator further selects the function information name "design function" that was added to the function information table 90 in (A3). Thereby, the storing control unit 34 temporarily stores a combination of the user group name "2nd design dept.", the function information name "design function" and the multi-function peripheral group name "2nd floor MFP" in the memory 30.

After the aforementioned operations, the administrator executes a second edition end operation (i.e., operates the OK button), whereupon the storing control unit 34 executes the processes (B1) to (B2) below based on the contents temporarily stored in the memory 30. In (B1), the storing control unit 34 adds, to the group combination table 40 (see FIG. 1), new relation information in which the user group name "2nd design dept.", the function information name "design function" and the multi-function peripheral group name "2nd floor MFP" are combined.

In (B1), the storing control unit 34 further adds, to the user group table group 70, the 2nd design dept. table 76 (see FIG. 3) in which the user group name "2nd design dept." and the combination information (i.e., the user name "Yamada", the user ID "ddd" and the password "444") are combined. Thereby, the user ID "ddd", the function information name "design function", and the multi-function peripheral group name "2nd floor MFP" are combined.

In (B2), the storing control unit 34 adds, to the MFP group table group 80, the 2nd floor MFP table 84 (see FIG. 4) in which the multi-function peripheral group name "2nd floor MFP", the multi-function peripheral name "MFP 210", and the multi-function peripheral name "MFP 220" are combined.

By the aforementioned processes (B1) to (B2), the user ID "ddd", the multi-function peripheral names "MFP 210", "MFP 220" and the function information specified by the function information name "design function" are combined. At this juncture, the storing control unit 34 does not execute a process similar to the process (A3) above, i.e., a process of adding a combination of the function information name "design function" and the function information into the function information table 90. This is because the function information name "design function" and the function information have already been combined in the function information table 90. According to this configuration, a plurality of items of function information indicating identical contents do not need to be stored in the memory 30.

After further executing the first edition end operation, the administrator executes the edition start operation. The administrator inputs the user group name "sales dept." into the "edit user group" screen of FIG. 6. The administrator further operates the add button on the "edit user group" screen of FIG. 6, causing the "edit user" screen of FIG. 6 to be displayed in the display unit 12. The administrator inputs a user name "May", a user ID "ccc" and a password "333" into the "edit user" screen of FIG. 6. Thereby, the storing control unit 34 temporarily stores combination information (i.e., the user name "May", the user ID "ccc" and the password "333") in combination with the user group name "sales dept." in the memory 30.

Next, the administrator causes the "function information viewer" screen of FIG. 7 to be displayed in the display unit 12 and operates the add function button on the "function information viewer" screen. The administrator inputs the function information name "sales function" into the "function information" screen of FIG. 7 shown in the display unit 12. Further, the administrator selects one of "usable" and "not usable" for each of the plurality of functions. Thereby, the storing control unit 34 temporarily stores a combination of the function information name "sales function" and the function information (i.e., information indicating the function name and the selection result of the user for each of the plurality of functions) in the memory 30.

Next, the administrator causes the "relation information viewer" screen of FIG. 9 to be displayed in the display unit 12 and operates the add new information button on the "relation information viewer" screen, causing the "edit relation information" screen of FIG. 9 to be displayed in the display unit 12. The administrator selects the user group name "sales dept." and the function information name "sales function". The administrator further selects the multi-function peripheral group name "1st floor MFP" that was added in (A2). Thereby, the storing control unit 34 temporarily stores a combination of the user group name "sales dept.", the function information name "sales function" and the multi-function peripheral group name "1st floor MFP" in the memory 30.

After the aforementioned operations, the administrator executes a third edition end operation (i.e., operates the OK button), whereupon the storing control unit 34 executes the processes (C1) to (C2) below based on the contents temporarily stored in the memory 30. In (C1), the storing control unit 34 adds, to the group combination table 40 (see FIG. 1), new relation information in which the user group name "sales dept.", the function information name "sales function" and the multi-function peripheral group name "1st floor MFP" are combined.

In (C1), the storing control unit 34 further adds, to the user group table group 70, the sales dept. table 74 (see FIG. 3) in which the user group name "sales dept." and the combination information (i.e., the user name "May", the user ID "ccc" and the password "333") are combined. Thereby, the user ID "ccc", the function information name "sales function" and the multi-function peripheral group name "1st floor MFP" are combined.

In (C2), the storing control unit 34 adds, to the function information table 90 (see FIG. 2), a combination of the function information name "sales function" and the function information.

By the aforementioned processes (C1) to (C2), the user ID "ccc", the multi-function peripheral names "MFP 110", "MFP 120" and the function information specified by the function information name "sales function" are combined. At this juncture, the storing control unit 34 does not execute a process similar to the process (A2) above, i.e., a process of adding, into the MFP group table group 80, the 1st floor MFP table 82, in which the multi-function peripheral group name "1st floor MFP" and the multi-function peripheral names "MFP 110", "MFP 120" are combined. This is because the 1st floor MFP table 82 is already present in the MFP group table group 80. According to this configuration, a plurality of multi-function peripheral names indicating identical contents do not need to be stored in the memory 30.

(Processes from S16 of FIG. 5 Onwards)

Next, the contents of processes from S16 of FIG. 5 onwards will be described. If the user wishes to use one multi-function peripheral (called "specific multi-function peripheral" below) from among the plurality of multi-function peripherals 110, etc. included in the system 2, the user inputs user ID and password into the specific multi-function peripheral. In this case, the specific multi-function peripheral sends, to the administrating server 10, a function information request that includes the user ID that has been input, the password that has been input and the multi-function peripheral name of the specific multi-function peripheral (e.g., the "MFP 110", called "specific multi-function peripheral name" below).

In S16, the receiving unit 35 monitors whether a function information request has been received via the LAN 4 from one multi-function peripheral from among the plurality of multi-function peripherals 110, etc. In a case where the function information request has not been received (NO in S16), the process returns to S12.

In a case where the receiving unit 35 has received the function information request (YES in S16), in S18 the first determining unit 37 determines whether the set of user ID and password included in the function information request is being stored in any of the plurality of user group tables 72 to 78 included in the user group table group 70. In a case of determining that the set of user ID and password is not being stored in any of the plurality of user group tables 72 to 78 (NO in S18), in S20 the sending unit 36 sends usage information indicating that the specific multi-function peripheral is not usable to the specific multi-function peripheral, and the process returns to S12.

Upon receiving the usage information sent in S20, the specific multi-function peripheral causes error information indicating that the specific multi-function peripheral is not usable to be displayed in the display unit. Further, even if the user executes an operation corresponding to a function (e.g., a color copy operation), the specific multi-function peripheral does not execute that function. That is, the specific multi-function peripheral prevents the user from using that specific multi-function peripheral.

On the other hand, in a case of determining that the set of user ID and password is being stored in any of the plurality of user group tables 72 to 78 (YES in S18), in S22 the first determining unit 37 determines whether the set of user ID and specific multi-function peripheral name included in the function information request is being stored in the memory 30. Specifically, firstly the first determining unit 37 specifies, from the user group table group 70, the user group name of the user group table included in the user ID. For example, in a case where the user ID included in the function information request is the user ID "aaa" of "Tom", the first determining unit 37 specifies the user group name "1st design dept." of the 1st design dept. table 72 (see FIG. 3). Further, e.g., in a case where the user ID included in the function information request is a user ID "fff" of "Bob", the first determining unit 37 specifies the user group name "guest" of the guest table 78 (see FIG. 3).

In a case where the specified user group name is "guest", the first determining unit 37 specifies the multi-function peripheral name (i.e., "MFP 110") included in the individual combination table 50 (see FIG. 1). Next, the first determining unit 37 determines whether the specific multi-function peripheral name included in the function information request matches the multi-function peripheral name that was specified (i.e., "MFP 110"). In a case of not matching (NO in S22), the process proceeds to S24, and in a case of matching (YES in S22), the process proceeds to S26.

On the other hand, in a case where the specified user group name is a user group name other than "guest" (e.g., "1st design dept"), the first determining unit 37 specifies the multi-function peripheral group name that is combined with the specified user group name from the group combination table 40 (see FIG. 1). For example, in a case where the specified user group name is "1st design dept", the first determining unit 37 specifies "1st floor MFP", which is combined with "1st design dept.", from the group combination table 40.

Moreover, in a case where a plurality of user group names were specified, the first determining unit 37 specifies, from the group combination table 40, the multi-function peripheral group names that are combined with the user group names for each of the plurality of user group names. As shown in FIG. 3, e.g., the user ID "bbb" of "John" is included in three tables 72, 74, 76. Consequently, in a case where the user ID included in the function information request is the user ID "bbb" of "John", the first determining unit 37 specifies the user group names "1st design dept.", "sales dept", and "2nd design dept". In this case, the first determining unit 37 specifies, from the group combination table 40 (see FIG. 1), the multi-function peripheral group name "1st floor MFP" that is combined with the user group names "1st design dept." and "sales dept.", and the multi-function peripheral group name "2nd floor MFP" that is combined with the user group name "2nd design dept".

Next, the first determining unit 37 determines whether the specific multi-function peripheral name (e.g., "MFP 110") included in the function information request is being stored in the MFP group table that includes the specified multi-function peripheral group name. In a case of determining that the specific multi-function peripheral name is being stored (YES in S22), the process proceeds to S26, and in a case of determining that the specific multi-function peripheral name is not being stored (NO in S22), the process proceeds to S24.

In S24, as in S20, the sending unit 36 sends usage information to the specific multi-function peripheral indicating that the specific multi-function peripheral is not usable, and the process returns to S12. Thereby, the specific multi-function peripheral prevents the user from using the specific multi-function peripheral. According to this configuration, the administrating server 10 can appropriately administrate whether the user is allowed to use the specific multi-function peripheral.

In the case where the user group name "guest" was specified in S22, in S26 the extracting unit 38 extracts the function information name "guest function" included in the individual combination table 50 (see FIG. 1). Next, the extracting unit 38 extracts the function information combined with the function information name "guest function" from the function information table 90 (see FIG. 2).

On the other hand, in the case where a user group name other than the user group name "guest" was specified in S22, in S26 the extracting unit 38 first specifies, from the MFP group table group 80, the multi-function peripheral group name combined with the specific multi-function peripheral name included in the function information request. Next, the extracting unit 38 extracts, from the group combination table 40 (see FIG. 1), the function information name combined with the specified multi-function peripheral group name, and the user group name specified in S22. For example, in a case where the user group name specified in S22 is "1st design dept.", in S26 the extracting unit 38 extracts the "design function". Further, e.g., in a case where the user group names specified in S22 are "1st design dept.", "sales dept." and "2nd design dept." (i.e., in the case where the user ID included in the function information request is the user ID "bbb" of "John"), in S26 the extracting unit 38 extracts the "design function" and the "sales function". Next, the extracting unit 38 extracts, from the function information table 90 (see FIG. 2), the function information combined with the specified function information name.

Next, in S28, the second determining unit 39 determines whether or not a plurality of items of function information (e.g., "design function" and "sales function") have been extracted. In a case where it is determined that only one item of function information has been extracted (NO in S28), the process proceeds to S36, and in a case where it is determined that a plurality of items of function information have been extracted (YES in S28), the process proceeds to S30.

In S30, the second determining unit 39 determines whether the duplication authority policy (see FIG. 7) is "OR" or "AND". In a case where the duplication authority policy is "OR" (YES in S30), in S34 the sending unit 36 executes the process below, thus generating new function information. That is, in a case where, from among the plurality of items of function information (e.g., "design function" and "sales function") that was extracted, a specific function (e.g., "color copy") is not allowed to be used (i.e., "X") in one of the items of function information (e.g., "design function"), whereas the specific function is allowed to be used (i.e., "O") in the other item of function information (e.g., "sales function"), new function information is generated indicating that the specific function is allowed to be used.

On the other hand, in a case where the duplication authority policy is "AND" (NO in S30), in S32 the sending unit 36 executes the process below, thus generating new function information. That is, in a case where, from among the plurality of items of function information that were extracted, a specific function is not allowed to be used in one of the items of function information, whereas the specific function is allowed to be used in the other item of function information, the sending unit 36 generates new function information indicating that the specific function is not allowed to be used.

Moreover, in S32 and S34, regardless of whether the duplication authority policy is "AND" or "OR", for a function that all of the plurality of extracted items of function information indicates as usable, the sending unit 36 generates new function information indicating that the function is allowed to be used, and for a function that all of the plurality of extracted items of function information indicate as not usable, the sending unit 36 generates new function information indicating that the function is not allowed to be used.

According to this configuration, in the case where it is indicated in one item of function information, among the plurality of items of function information extracted in S26, that a specific function is allowed to be used, and it is indicated in another item of function information that the specific function is not allowed to be used, the sending unit 36 can generate appropriate function information in accordance with the duplication authority policy.

In S36, which is executed in the case of NO in S28, the sending unit 36 sends the one item of function information extracted in S26 to the specific multi-function peripheral. On the other hand, in S36, which is executed after S32 or S34, the sending unit 36 sends the new function information generated in S32 or S34 to the specific multi-function peripheral.

Upon receiving the function information sent in S36, the specific multi-function peripheral allows the user to execute the operation corresponding to the function. The user can execute the operation corresponding to the function in the operation unit of the specific multi-function peripheral. For example, a case where the specific multi-function peripheral receives the function information "design function" (see FIG. 2) from the administrating server 10 will be described. In a case where the user executed an operation corresponding to FAX or color copy, the specific multi-function peripheral displays error information in the display unit indicating that the function cannot be executed. On the other hand, in a case where the user executed an operation corresponding to a function other than FAX or color copy (e.g., monochrome copy), the specific multi-function peripheral executes the function corresponding to the operation of the user.

(Effect of the Present Embodiment)

For each of a plurality of users, the administrating server 10 can administrate which multi-function peripheral the user is allowed to use from among a plurality of multi-function peripherals, and can administrate which type of function of the multi-function peripheral the user is allowed to use.

(Corresponding Relationships)

The administrating server 10 is an example of the "administrating device", and the plurality of multi-function peripherals 110 to 220 are an example of the "plurality of devices". The multi-function peripheral name stored in the MFP group table storage area 80 is an example of the "device information". The specific multi-function peripheral name is the "specific device identification information", the user ID included in a usability request is an example of the "specific user identification information", and the user ID and the specific multi-function peripheral name included in the usability request is an example of the "specific identification information". The function information sent in S36 is an example of the "first usage information". The usage information sent in S24 of FIG. 5 is an example of the "second usage information". The duplication authority policies "OR" and "AND" are respectively examples of the "first setting" and the "second setting".

The operations for executing the processes (A1) to (A3) (i.e., the input of each item and the first edition end operation) are an example of the "first instruction". Similarly, the operations for executing the processes (B1) to (B2) and the operations for executing the processes (C1) to (C2) are respectively examples of the "second instruction" and the "third instruction". The user Ms "bbb", "ddd" and "ccc" are respectively examples of the "first user identification information", the "second user identification information" and the "third user identification information". The user group name "1st design dept." is an example of the "user specific information". The multi-function peripheral name "MFP 110" is an example of the "first device information", and the multi-function peripheral name "MFP 210" is an example of the "second device information". The multi-function peripheral group names "1st floor MFP" and "2nd floor MFP" are respectively examples of the "first device specifying information" and the "second device specifying information". The function information corresponding to "design function" of the function information table 90 is an example of the "first function information", and the function information name "design function" is an example of the "first function specifying information". The function information corresponding to "sales function" of the function information table 90 is an example of the "second function information", and the function information name "sales function" is an example of the "second function specifying information".

(Variants)

(1) The plurality of multi-function peripherals 110, etc. may be connected with a communication device such as a PC, etc. By operating an operation unit of the communication device, the user may input user ID and password to the communication device. The communication device may send the user ID and password that have been input to a multi-function peripheral. The multi-function peripheral may send the user ID and password received from the communication device to the administrating server 10. In this case, the administrating server 10 may execute the process of FIG. 5 using the user ID and password received from the multi-function peripheral.

(2) In a case where a communication device is connected with the plurality of multi-function peripherals 110, etc., when the user executes a predetermined operation on the communication device, the communication device may send its own node name to the multi-function peripherals. The multi-function peripherals may send the node name received from the communication device to the administrating server 10. In this variant, the node name of the communication device may be stored, instead of the user ID, in the tables 72 to 78 of the user group table group 70. In this case, the administrating server 10 may execute the process of FIG. 5 using the node name received from the multi-function peripheral. In this variant, the node name is an example of the "user identification information".

(3) In the embodiment above, in S36 of FIG. 5 the sending unit 36 of the administrating server 10 sends the function information extracted in S26 or the function information generated in S32 or S34 to the specific multi-function peripheral. Both the functions that are usable and the functions that are not usable are included in this function information. However, the sending unit 36 may send information indicating only the functions that are usable, or information indicating only the functions that are not usable to the specific multi-function peripheral. In this variant, the information indicating only the functions that are usable, or the information indicating only the functions that are not usable is an example of "first usage information".

(4) The specific multi-function peripheral may send a function information request that includes the user ID and the password and does not include the multi-function peripheral name. In this case, the administrating server 10 may send, to the specific multi-function peripheral, the multi-function peripheral group table and the function information corresponding to the user ID included in the function information request. In this case, the specific multi-function peripheral may determine whether the multi-function peripheral name of the specific multi-function peripheral is included in the multi-function peripheral group table sent from the administrating server 10. In a case where the multi-function peripheral name is included, the specific multi-function peripheral may have the user select the functions to be executed. On the other hand, in a case where the multi-function peripheral name is not included, the specific multi-function peripheral may cause error information to be displayed in the display unit indicating that the specific multi-function peripheral is not allowed to be used. In this variant, the user ID is an example of the "specific identification information", and the multi-function peripheral group table and the function information is an example of the "first usage information".

(5) The specific multi-function peripheral may send a function information request that includes the multi-function peripheral name and does not include the user ID and password. In this case, the administrating server 10 may send, to the specific multi-function peripheral, the user group table and the function information corresponding to the multi-function peripheral name included in the function information request. In this case, the specific multi-function peripheral may determine whether the user ID input into the specific multi-function peripheral is included in the user group table sent from the administrating server 10. In a case where the user ID is included, the specific multi-function peripheral may have the user select the functions to be executed. On the other hand, in a case where the user ID is not included, the specific multi-function peripheral may cause error information to be displayed in the display unit indicating that the specific multi-function peripheral is not allowed to be used. In this variant, the multi-function peripheral name is an example of the "specific identification information". The user group table and the function information is an example of the "first usage information".

(6) The specific multi-function peripheral may have the user select the functions that the specific multi-function peripheral should execute after having the user input the user ID and password. The multi-function peripheral may send a function information request that includes the user ID and password, the multi-function peripheral name and the selected function. In this case, the administrating server 10 determines whether the function included in the function information request is "usable" using the generated function information in a case where the function information was generated in S32 or S34 of FIG. 5, or using the function information extracted in S26 in a case where the function information was not generated in S32 or S34 of FIG. 5. The administrating server may send information indicating the determined results, i.e., "usable" or "not usable" to the specific multi-function peripheral. In this variant, the information indicating "usable" or "not usable" is an example of the "first usage information".

(7) In the above embodiment, a plurality of items of combination information that include the user name, user ID and password may be stored in any of the plurality of user group tables 72 to 78. However, a plurality of items of combination information may be stored in one user table. That is, in a case where the user name, user ID and password are input to the administrating server 10, the storing control unit 34 may store the user name, user ID and password that have been input in one user table. In this case, the relation information may be information in which user ID, function information name and multi-function peripheral group name are combined for each of the plurality of user IDs stored in the one user table.

(8) In the above embodiment, a plurality of multi-function peripheral names may be stored in any of the plurality of MFP group tables 82, 84. However, the multi-function peripheral names may be stored in one MFP table. That is, in a case where the multi-function peripheral names are input to the administrating server 10, the storing control unit 34 may store the multi-function peripheral names that have been input in one MFP user table. In this case, the relation information may be information in which multi-function peripheral name, user group name and function information name are combined for each of the plurality of function peripheral names stored in the one MFP table.

(9) The group combination table 40 and the individual combination table 50 may be one, combination table. In this case, the one combination table may store relation information in which one of the user group names and the user names, the function information name, and one of the multi-function peripheral group names and the multi-function peripheral names are combined.

(10) The function information table 90 may store specific function information in which the user name and the multi-function peripheral name are not combined in either the group combination table 40 or the individual combination table 50. In a case where a function information request that does not include a user ID and a password is received by the receiving unit 35, the extracting unit 38 may extract the specific function information from the function information table 90. The sending unit 36 may send the extracted specific function information to the multi-function peripheral that is the source of the function information request.

(11) In the above embodiment, the CPU 22 realizes the units 34 to 39 by executing processes according to the program 32. However, at least one of the units 34 to 39 may be realized by hardware such as a logic circuit, etc.

(12) At least one of the "plurality of devices" need not be a multi-function peripheral, but may be a printer, FAX, or scanner.

The invention claimed is:

1. An administrating device configured to be connected with a plurality of devices via a network and configured to administrate the plurality of devices, the administrating device comprising:
   one or more processors; and
   an instruction memory that stores computer-readable instructions therein, the computer-readable instructions, when executed by the one or more processors, causing the administrating device to perform:
   storing, a device group table and a combination table,
      the device group table storing one or more device groups,
         each device group comprising at least,
         a device group name, and
         two or more items of device information, associated with the device group name, the device information identifying one or more devices from the plurality of devices,
      he combination table storing at least each device group name and function information associated with each device group name,
         the function information identifying one or more types of functions from two or more types of functions which the plurality of devices are capable of executing, the one or more types of functions usable by at least one of a plurality of users;
   receiving specific identification information from a specific device among the plurality of devices, the specific identification information including specific device identification information for identifying the specific device, specific user identification information for identifying a specific user, or a combination thereof;
   in response to receiving the specific identification information, extracting one or more items of specific function information from the combination table by using the specific identification information;
   determining whether two or more items of specific information are extracted, wherein in a case where it is determined that two or more items of the specific function information are extracted, with one of the two or more items of specific function information indicating that the specific user is allowed to use a specific function and another of the two or more items of specific function information indicating that the specific user is not allowed to use the specific function, determining which one of a first setting or a second setting is currently set in the administrating device, where in a case where it is determined that the first setting is currently set in the administrating device, obtaining using the specific function information, first usage information indicating that the specific user is allowed to use the specific function in the specific device, and in a case where it is determined that the second setting is currently set in the administrating device, obtaining using the specific function information, the first usage information indicating that the specific user is not allowed to use the specific function in the specific device; and sending first usage information to the specific device, the first usage information indicating which type of function among the two or more types of functions the specific user is allowed to use in the specific device.

2. The administrating device as in claim 1, wherein
the specific identification information includes both the specific device identification information and the specific user identification information,
the computer-readable instructions, when executed by the one or more processors, cause the administrating device to perform:
specifying the device group name combined with specific device information in the device group table, the specific device information relating to the specific device identified by the specific device identification information,
determining, in accordance with the specified device group name, whether or not the specific user identified by the specific user identification information is allowed to use the specific device identified by the specific device identification information;
executing the sending of the first usage information in a case where it is determined that the specific user is allowed to use the specific device; and
sending second usage information to the specific device in a case where it is determined that the specific user is not allowed to use the specific device, the second usage information indicating that the specific user is not allowed to use the specific device.

3. The administrating device as in claim 1, wherein
in a case where a first instruction is provided to the administrating device, the storing includes:
(A1) causing the specific memory to store a combination of first user identification information for identifying a first user, first device group name for specifying first device information, and first function specifying information for specifying first function information;
(A2) causing the specific memory to store a combination of the first device group name and the first device information; and
(A3) causing the specific memory to store a combination of the first function specifying information and the first function information,
in order to combine the first user identification information, the first device information, and the first function information.

4. The administrating device as in claim 3, wherein
the computer-readable instructions, when executed by the one or more processors, cause the administrating device to further perform:
storing a user group table in the specific memory, the user group table storing a combination of user specific information for specifying a plurality of items of user identification information for identifying the plurality of users and the plurality of items of user identification information,
the above (A1) includes:
causing the specific memory to store the first user identification information combined with the user specific information in the user group table; and
causing the combination table to store a combination of the user specific information, the first device group name and the first function specifying information,
in order to combine, for each of the plurality of items of user identification information, the user identification information, the first device group name and the first function specifying information.

5. The administrating device as in claim 4, wherein
the computer-readable instructions, when executed by the one or more processors, cause the administrating device to further perform:
storing in the specific memory other than the user group table, a combination of other user identification information, other device information and other function information, the other user identification information for identifying a user other than the plurality of users, the other device information being related to one or more devices usable by the other user among the plurality of devices, and the other function information being related to one or more types of functions usable by the other user among two or more types of functions which the one or more devices usable by the other user among the plurality of devices are capable of executing.

6. The administrating device as in claim 3, wherein in a case where a second instruction is provided after the first instruction has been provided, the storing further includes:
(B1) causing the specific memory to store a combination of second user identification information for identifying a second user different from the first user, second device group name for specifying second device information different from the first device information, and the first function specifying information; and (B2) causing the specific memory to store a combination of the second device group name and the second device information, in order to combine the second user identification information, the second device information and the first function information, and
in the case where the second instruction is provided, storing the combination of the first function specifying information and the first function information is not performed.

7. The administrating device as in claim 3, wherein
in a case where a third instruction is provided after the first instruction has been provided, the storing further includes:
(C1) causing the specific memory to store a combination of third user identification information for identifying a third user different from the first user, the first device group name, and second function specifying information for specifying second function information different from the first function information; and (C2) causing the specific memory to store a combination of the second function specifying information and the second function information, in order to combine the third user identification information, the first device information and the second function information, and in the case where the third instruction is provided, storing the combination of the first device group name and the first device information is not performed.

8. The administrating device as in claim 1, wherein the computer-readable instructions, when executed by the one or more processors, cause the administrating device to further perform:

storing in the specific memory, a function information table for storing a combination of function specifying information for specifying one or more function information and two or more items of the function information, and the combination table stores a combination of the device group name and the function specifying information.

9. An administrating device configured to be connected with a plurality of devices via a network and configured to administrate the plurality of devices, the administrating device comprising a processor configured to implement:

storing a device group table and a combination table, the device group table storing one or more device groups, each device group comprising at least a device group name, and two or more items of device information associated with the device group name, the device information identifying one or more devices from the plurality of devices, the combination table storing at least each device group name and function information associated with each device group name, the function information identifying one or more types of functions from two or more types of functions which the plurality of devices are capable of executing, the one or more types of functions usable by the at least one of the plurality of users;

receiving specific identification information from a specific device among the plurality of devices, the specific identification information including specific device identification information for identifying the specific device, specific user identification information for identifying a specific user, or a combination thereof;

in response to receiving the specific identification information, extracting one or more items of specific function information from the combination table by using the specific identification information; and determining whether two or more items of specific information are extracted, wherein in a case where it is determined that two or more items of the specific function information are extracted, with one of the two or more items of specific function information indicating that the specific user is allowed to use a specific function and another of the two or more items of specific function information indicating that the specific user is not allowed to use the specific function, determining which one of a first setting or a second setting is currently set in the administrating device, where in a case where it is determined that the first setting is currently set in the administrating device, obtaining using the specific function information, first usage information indicating that the specific user is allowed to use the specific function in the specific device, and in a case where it is determined that the second setting is currently set in the administrating device, obtaining using the specific function information, the first usage information indicating that the specific user is not allowed to use the specific function in the specific device; and sending first usage information to the specific device, the first usage information indicating which type of function among the two or more types of functions the specific user is allowed to use in the specific device.

10. A non-transitory computer-readable storage medium storing computer-readable instructions for an administrating device configured to be connected with a plurality of devices via a network and configured to administrate the plurality of devices, the computer-readable instructions, when executed by one or more processors mounted on the administrating device, causing the administrating device to perform:

storing, a device group table and a combination table, the device group table storing one or more device groups, each device group comprising at least, a device group name, and two or more items of device information, associated with the device group name, the device information identifying one or more devices from the plurality of devices, the combination table storing at least each device group name and function information associated with each device group name, the function information identifying one or more types of functions from two or more types of functions which the plurality of devices are capable of executing, the one or more types of functions usable by at least one of a plurality of users;

receiving specific identification information from a specific device among the plurality of devices, the specific identification information including specific device identification information for identifying the specific device, specific user identification information for identifying a specific user, or a combination thereof;

in response to receiving the specific identification information, extracting one or more items of specific function information from the combination table by using the specific identification information;

determining whether two or more items of specific information are extracted, wherein in a case where it is determined that two or more items of the specific function information are extracted, with one of the two or more items of specific function information indicating that the specific user is allowed to use a specific function and another of the two or more items of specific function information indicating that the specific user is not allowed to use the specific function, determining which one of a first setting or a second setting is currently set in the administrating device, where in a case where it is determined that the first setting is currently set in the administrating device, obtaining using the specific function information, first usage information indicating that the specific user is allowed to use the specific function in the specific device, and in a case where it is determined that the second setting is currently set in the administrating device, obtaining using the specific function information, the first usage information indicating that the specific user is not allowed to use the specific function in the specific device; and sending first usage information to the specific device, the first usage information indicating which type of function among the two or more types of functions the specific user is allowed to use in the specific device.

* * * * *